(12) United States Patent
Hall (10) Patent No.: US 7,761,460 B1
(45) Date of Patent: Jul. 20, 2010

(54) SYSTEMS AND METHODS THAT UTILIZE A STANDARD DATABASE INTERFACE TO ACCESS DATA WITHIN AN INDUSTRIAL DEVICE

(75) Inventor: Kenwood Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 450 days.

(21) Appl. No.: 10/771,583

(22) Filed: Feb. 4, 2004

(51) Int. Cl.
G06F 17/30 (2006.01)
G06F 7/22 (2006.01)

(52) U.S. Cl. .................. 707/756; 707/793; 707/803

(58) Field of Classification Search ............... 707/1–10, 707/100–104.1
See application file for complete search history.

(56) References Cited

U.S. PATENT DOCUMENTS

| | | | |
|---|---|---|---|
| 5,968,127 A | | 10/1999 | Kawabe |
| 5,999,933 A | * | 12/1999 | Mehta .................. 707/100 |
| 6,088,624 A | * | 7/2000 | Khan et al. ............ 700/86 |
| 6,122,639 A | * | 9/2000 | Babu et al. ............ 707/103 R |
| 6,141,595 A | * | 10/2000 | Gloudeman et al. ...... 700/83 |
| 6,208,993 B1 | | 3/2001 | Shadmon |
| 6,256,637 B1 | * | 7/2001 | Venkatesh et al. ...... 707/103 Y |
| 6,370,569 B1 | | 4/2002 | Austin |
| 6,434,157 B1 | | 8/2002 | Dube |
| 6,523,036 B1 | * | 2/2003 | Hickman et al. .......... 707/10 |
| 6,999,956 B2 | * | 2/2006 | Mullins ..................... 707/2 |
| 7,467,018 B1 | * | 12/2008 | Callaghan .................. 700/1 |
| 2002/0091702 A1 | * | 7/2002 | Mullins .................. 707/100 |
| 2003/0172046 A1 | * | 9/2003 | Scott ........................ 707/1 |
| 2004/0143791 A1 | * | 7/2004 | Ito et al. .................. 715/513 |

* cited by examiner

*Primary Examiner*—Tim T. Vo
*Assistant Examiner*—Sangwoo Ahn
(74) *Attorney, Agent, or Firm*—Turocy & Watson LLP; R. Scott Speroff; John M. Miller (57) ABSTRACT

The present invention relates to systems and methods that maps industrial device data (e.g., from data structures) to database tables that can be accessed via standard database interfaces. In various aspects of the present invention, elements associated with one or more data structures can be represented in one or more database tables. Typically, data structure elements are stored within respective columns of a record of a database table(s). Individual database tables can be accessed via a standard interface such as JDBC in order to store data within (e.g., write) and/or retrieve data from (e.g., read) a database table. In addition, a plurality of database tables can be concurrently accessed for distributed transaction processing. Thus, the subject invention provides access to industrial control data without having to install and/or execute custom or specialized software on either the industrial device or the system accessing the industrial device.

23 Claims, 9 Drawing Sheets

SYSTEMS AND METHODS THAT UTILIZE A STANDARD DATABASE INTERFACE TO ACCESS DATA WITHIN AN INDUSTRIAL DEVICE

TECHNICAL FIELD

The present invention generally relates to industrial control systems, and more particularly to systems and methods that map industrial device data structures to database tables that can be accessed via a standard database interface.

BACKGROUND OF THE INVENTION

Industrial control devices are commonly utilized in manufacturing environments to improve control and monitor of plant processes via automating and/or semi-automating such processes. The typical industrial control device (e.g., industrial controllers and programmable logic controllers (PLCs)) comprises a plurality of modules such as a control module(s), an interface module(s) and an Input/Output (IO) module(s), which are utilized in connection with electrical, mechanical, hydraulic and pneumatic systems and processes.

A basic control module can comprise a one or more virtual relays, contactors, counters, timers and other hardware, software and/or firmware based means to facilitate industrial device control. These virtual components typically are user configurable (e.g., user written application specific code). I/O modules provide communication between industrial control devices and the environment. For example, an input channel (s) can be employed to receive analog and digital signals through sensors, switches and the like to provide information indicative of state(s) (e.g., on/off) and/or relating to a process (s), whereas an output channel(s) can be utilized to convey a next state to an entity under control of the controller.

In conventional systems, a custom interface is usually required to couple a remote computer and the industrial controller in order to provide the remote computer with access to the industrial controller. Such interfaces provide the communication channel and/or protocol and commonly require installation of special drivers on both the remote computer and industrial controller. These drivers typically are operating system dependent; and thus, in order to provide access to the industrial controller via a plurality of remote computers with disparate operating systems, more than specialized driver must be installed. Interface and driver development consume time and require testing and maintenance, which can lead to increased production cost. Moreover, controller, computer and/or operating system revisions can render interfaces and/or drivers obsolete, necessitating further development and consumption of resources (e.g., time and money).

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods that provide access to data stored in connection with industrial components (e.g., devices, controllers, etc.) through a standard database interface. The systems and methods include a component that maps data stored in one or more data structures to one or more database tables. This component typically resides with the industrial controller processing unit or interface. In general, this component can map the elements of a data structure to columns of a record associated with a database table. However, it is to be appreciated that at least one database table can be generated with a plurality of records that are utilized to store data from one or more one data structures. In addition, more than one database table can be generated and populated with elements of a similar data structure(s). Moreover, more than one database table can be concurrently accessed and/or updated, which provides for distributed transaction processing such as concurrent transaction commitment, abortion and/or rollback.

Tables generated via this mapping can be accessed through a standard database interface such as JDBC, which typically is employed in connection with a host driver that is written in JAVA such that it can be ported to essentially any platform. Thus, a programmer can write code that can read from and write to these database tables without any platform specific software (e.g., interfaces, drivers and operating system specific software). Conventional systems typically require installation and execution of custom interfaces and specialized drivers on both the computing and industrial control device. The custom and specialized software typically are operating system dependent; and thus, a plurality of drivers may need to be generated and loaded in order to provide access by various systems running different operating systems.

As noted above, the novel systems and methods of the present invention provide for utilization of standard database interfaces without any custom or specialized software. Thus, the present invention improves upon conventional systems via mitigating any need to develop, install and execute custom interface and specialized drivers on the industrial control and computing devices. The foregoing can improve performance by freeing processing cycles and memory and reduce cost associated with interface and driver development, testing and maintenance.

In one aspect of the present invention, a system is provided that facilitates access to industrial device data. The system comprises a data-mapping component that generates and populates database tables with data from data structures and an interface component that provides access to the database tables. When activated, the data-mapping component can be employed within the industrial device to discover data structures and represent the data structure as one or more database tables. Typically, respective elements of a data structure are mapped to columns of the database table(s). The interface component enables communication between the database tables and remote machines, wherein any standard database connection can be utilized be utilized to read data from the database tables and/or write data to the database tables. Utilizing a standard database connection mitigates the need to run custom and/or specialized software on the industrial device and/or the machine. Data can be transferred between the industrial device and remote machine as compact binary information, which can reduce bandwidth requirements (e.g., the number of bytes required to send particular data) and decrease processing load and time. In addition, data in one or more database tables can be concurrently committed, rolled back and/or aborted.

In another aspect of the present invention, methods are provided that facilitate access to data within industrial devices. In one instance, a method can be employed to represent data structures as database tables, wherein elements of respective data structures are mapped to columns of a record of the database table. A remote machine can employ a standard database connection to access the data within the database tables. Such access includes reading and writing data and can occur concurrently across a plurality of relational tables. In another instance, a method is provided that establishes a database connection with an industrial device via a standard database interface. Since the industrial device data is stored within relational database tables, custom software does not need to be executing on either the industrial device or the remote system in order to access the data. In addition, the remote device can invoke discovery of available relational tables. The remote device can then be utilized to access the industrial device data.

In other aspects of the present invention, an exemplary database table is illustrated along with an exemplary technique for mapping a data structure to the exemplary database table. In addition, a distributed system is illustrated that facilitates access to data within a plurality industrial devices residing on disparate industrial networks via a plurality of computing devices residing on disparate networks and employing different operating systems.

The following description and annexed drawings set forth in detail certain illustrative aspects of the present invention. These aspects are indicative, however, of but a few of the various ways in which the principles of the invention may be employed and the present invention is intended to include all such aspects and their equivalents. Other advantages and novel features of the present invention will become apparent from the following detailed description of the invention when considered in conjunction with the drawings.

DETAILED DESCRIPTION OF THE INVENTION

The present invention provides systems and methods that represent data structures within industrial controllers as database tables that can be accessed via a standard database interface (e.g., JDBC, ODBC and the like). The novel systems and methods can be utilized to map a single data structure to one database table; more than one data structure to one database table; a single data structure to more than one database table; and more than one data structure to a plurality of database tables. Such database tables can be concurrently accessed for distributed transaction processing (e.g., concurrent transaction commitment, abortion and/or rollback). The foregoing enables a programmer to write code that can read from and write to these database tables without any custom or specialized platform software (e.g., interfaces, drivers and operating system).

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used herein, the terms "component," "device," "controller," and the like are intended to refer to a computer-related entity, either hardware, a combination of hardware and software, software, or software in execution. For example, a component can be, but is not limited to, a process running on a processor, a processor, an object, an executable, a thread of execution, a program, a microprocessor, a processing unit and/or a computer. In addition, one or more components can reside within a process and/or thread of execution and a component can be localized on a computer and/or distributed amongst a plurality of computers. Furthermore, such components can be executed within various computer readable media, wherein respective media can be associated with disparate data structures. Moreover, such components can communicate via local and/or remote processes, for example, in accordance with a signal with one or more data packets (e.g., data from a component interacting with another component in a local system, distributed system, and/or across a network such as the Internet with other systems via the signal).

Figure 1:
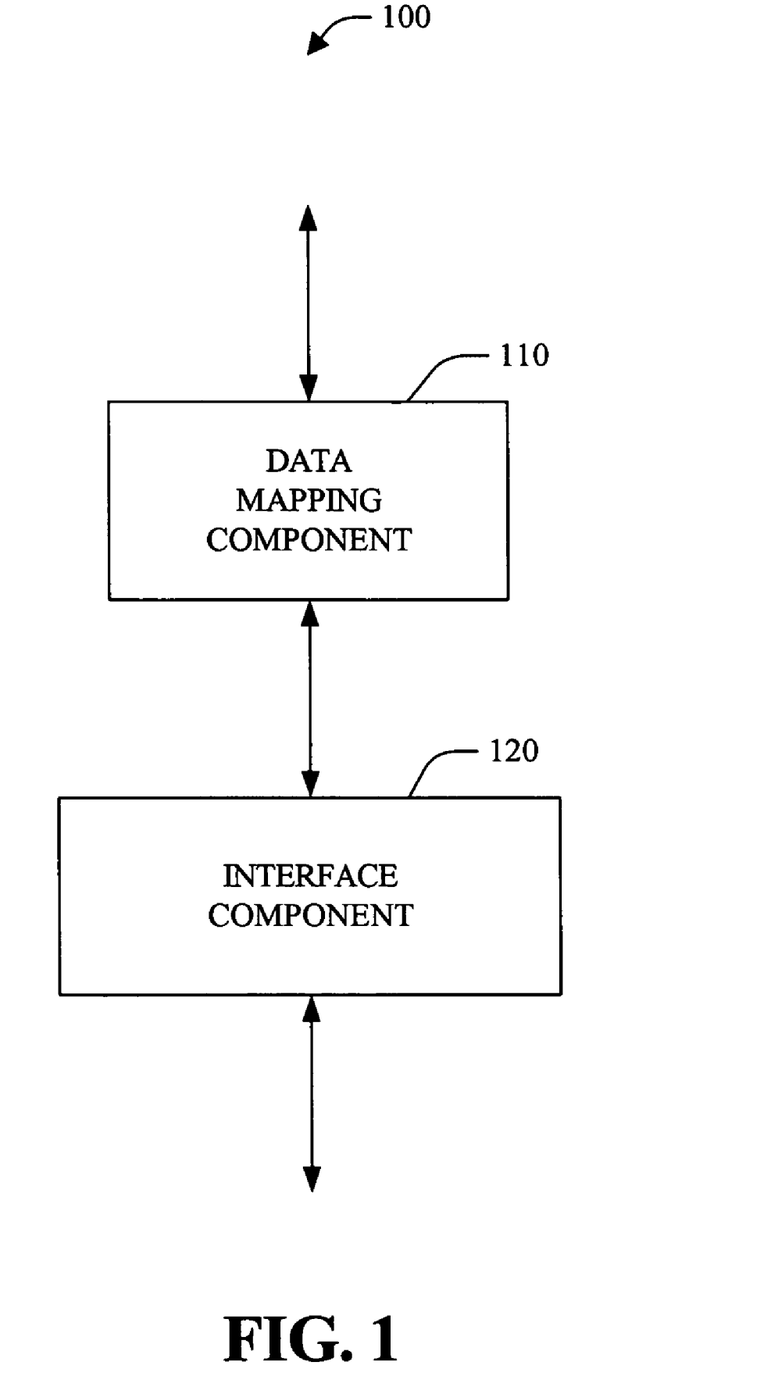
FIG. 1 illustrates an exemplary system that provides access to data stored in database tables associated with industrial devices, in accordance with an aspect of the present invention.

FIG. 1 illustrates a system 100 that facilitates access to industrial device data, in accordance with an aspect of the present invention. The system 100 comprises a data mapping component 110 that generates and populates database tables and an interface component 120 that provides access to the database tables. It is to be appreciated that the data mapping component 110 can reside within the industrial device (e.g., within one or more processing units therein), a host computer (not shown), and/or a communications interface such as the interface component 120.

When activated, the data mapping component 110 can discover data structures and transform these data structures into database tables. In one aspect of the present invention, the data mapping component 110 can be activated when a request to access the industrial device's data is received. In another aspect of the present invention, the data mapping component 110 can be automatically activated, for example, based on time lapse, activity, a polling technique, etc. In yet another aspect of the present invention, intelligence can be utilized to facilitate determining when, how and which data structures should be transformed to corresponding database tables.

Typically, the data mapping component 110 stores respective elements of a data structure column-by-column within a record of a database table. When more than one data structure is mapped, respective rows of the database table generally correspond to respective data structures such that N (where N is an integer) data structures map to N rows, or records of the database table. It is to be appreciated that the elements of one or more data structures can alternatively be stored row-by-row or variously amongst database table cells, including across records.

The interface component 120 provides a communication channel in which external devices can access the data within the database tables. Since the data mapping component 110 generates database tables, any standard database interface can interact with the interface component 120 to access the database table data. For example, in one aspect of the present invention, Java DataBase Connectivity (JDBC), Open DataBase Connectivity (ODBC) and/or virtually any open source interface and/or API that can be utilized to read data from the database tables and/or write data to the database tables can be employed in accordance with aspects of the present invention. For example, any interface and/or API that can interact with SQL-compliant database since nearly all relational database management systems (DBMSs) support SQL. Since Java can be employed with most platforms, JDBC makes it possible to write a single database application that can run on different platforms and interact with different DBMSs.

Such support mitigates the need to develop custom software and execute the software on the industrial device and/or the platform accessing the database tables. Thus, a programmer need not have any knowledge of the data layout within the industrial device in order to access the data. In addition, the interface component 120 can be utilized to discover database tables and/or data structures within the industrial devices.

Typically, data is transferred to and from the industrial device as compact binary information rather than long ASCII formats such as XML. This can reduce the number of bytes required to send particular data and decrease processing load and time. In addition, database tables can be concurrently accessed to process transactions. Thus, transactions can be concurrently committed, rolled back and/or aborted. Moreover, any operating system that can utilize a standard database connection can be utilized. Conventional systems typically require custom code be executed on respective industrial devices and/or individual platforms, and commonly employ socket interfaces.

Figure 2:
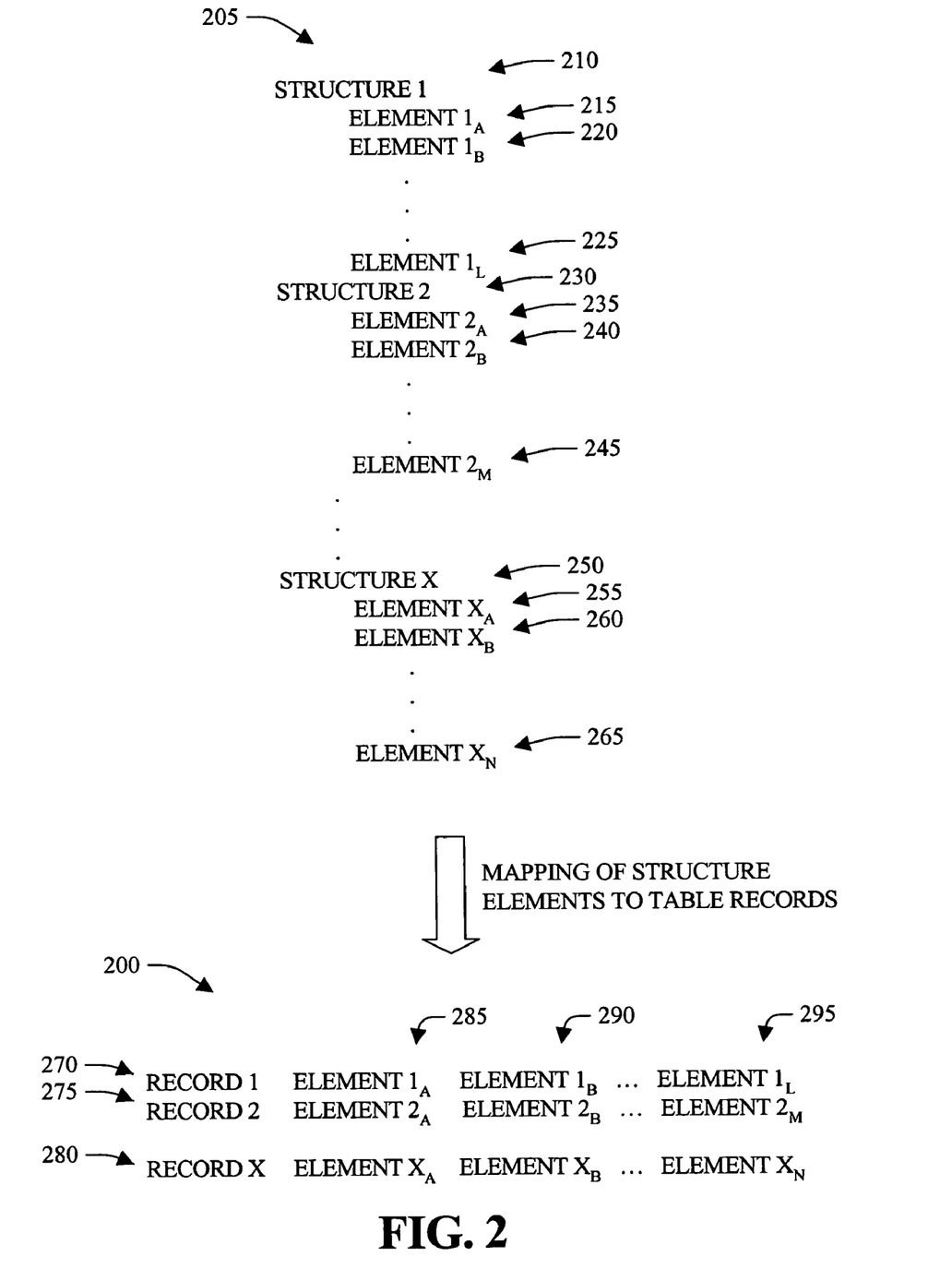
FIG. 2 illustrates an exemplary database table generated from a data structure comprising industrial device information, in accordance with an aspect of the present invention.

FIG. 2 illustrates an exemplary database table 200 generated from data structures associated with an industrial control device, in accordance with an aspect of the present invention. As depicted, the database table 200 is generated from an array of data structures 205 that comprises a data structure 210 with elements 215, 220 and 225, a data structure 230 with elements 235, 240 and 245, and a data structure 250 with elements 255, 260 and 265. The exemplary database table 200 comprises record 270, 275 and 280 that correspond to data structures 210, 230 and 250, respectively. The elements 215, 220 and 225, 235, 240 and 245, and 255, 260 and 265 of data structures 210, 230 and 250, respectively, are mapped to columns 285, 290 and 295 of records 270, 275 and 280, respectively. It is to be appreciated that the exemplary database table 200 is provided for explanatory purposes and brevity and that essentially any number of data structures and elements can be represented in one or more database tables in accordance with aspects of the present invention.

Figure 3:
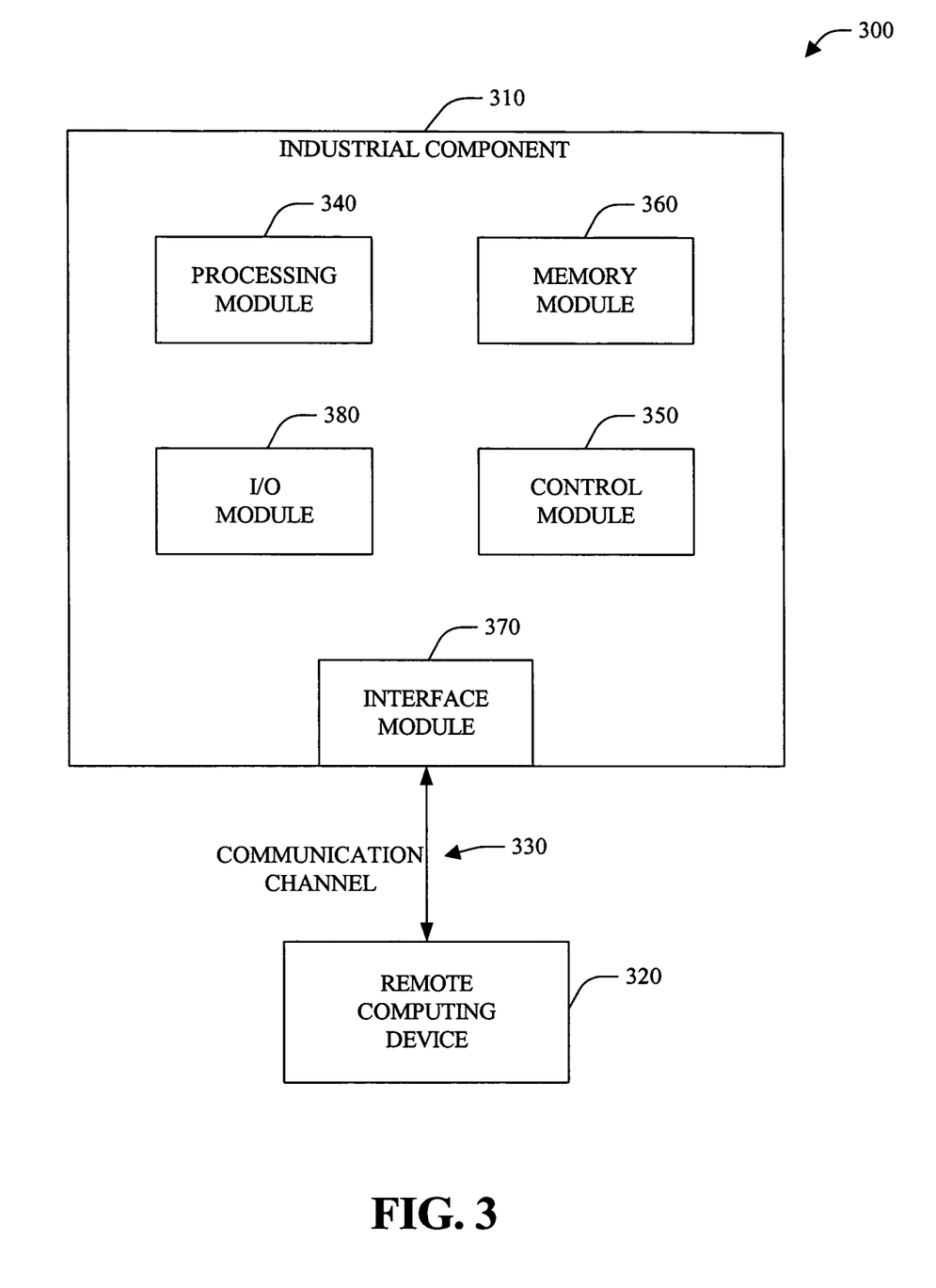
FIG. 3 illustrates an exemplary system for accessing industrial device data, in accordance with an aspect of the present invention.

FIG. 3 illustrates a system 300 for accessing industrial device data, in accordance with an aspect of the present invention. The system 300 comprises an industrial component 310, a remote computing device 320 and a communication channel 330 that couples the industrial component 310 and the remote computing device 320.

The industrial component 310 can be any industrial control device such as an industrial controller and programmable logic controllers, for example. As such, the industrial component 310 can comprise one or more modules such as a processing module 340, a control module 350, a memory module 360, an interface module 370 and an I/O module 380.

The processing module 340 can be utilized to execute programs such as data mapping programs. The control module 350 can manage and control industrial component 310 operation as well as coordinate data, control and address bus traffic. The control module 350 can control operation via virtual components such as software implemented relays, contactors, counters, timers, etc. Both the processing module 340 and the control 350 can comprise internal memory (not shown) as well as access common component memory.

The memory module 360 provides storage for at least applications and data. The memory module 360 can be accessed by the processing module 340, the control module 350 and/or the remote computing device 320. Data can be variously stored within the memory module 360, for example, as data structures and/or relational database tables. These virtual components typically are user configurable (e.g., user written application specific code). The interface module 370 provides access to the other modules. In addition, the interface component 370 stores and/or executes data mapping programs. The I/O module 380 provides communication with the environment. For example, an input channel can be employed to receive analog and digital signals through sensors, switches and the like to provide information indicative of state and/or relating to a process, whereas an output channel can be utilized to convey a next state to an entity under the control of the controller.

As noted above, the industrial component 310 can store data within the memory module 360. Like conventional systems, such data can be stored within one or more data structures defined therein. The present invention additionally provides for storing the data as relational tables. In one aspect of the present invention, the data mapping programs associated with the processing module 340 and/or interface module 370 can be employed to generate relational tables and populate the tables with the data from the data structures. Typically, the elements of a data structure are mapped to the columns of a row, or record of the relational table, as described in detail above. It is to be appreciated that in one aspect of the present invention, such mapping can occur as data is stored and manipulated within the data structures. In another aspect of the present invention, the mapping can dynamically occur when the remote computing device 320 establishes a connection with the industrial component 310. In yet another aspect of the present invention, at least a portion of the data mapping can occur within and/or in connection with the communication channel 330 and/or the remote computing device 320. In other aspects of the present invention, the mapping can commence based on predefined criteria such as time intervals, activity, state, manual activation, etc.

Storing the data within relational tables enables access to the data via a standard database connection such as JDBC and/or other standard interfaces as described herein without having to install and execute custom interfaces and/or specialized drivers. Thus, users of the remote computing device 320 can read/write data from/to the memory modules 340 without knowing the data layout. In addition, the user can employ the connection to browse and discover the relational tables. It is to be appreciated that the standard interface can be utilized to access individual records within a relational table and/or concurrently access data from a plurality of records associated with similar and/or different relational tables.

Figure 4:
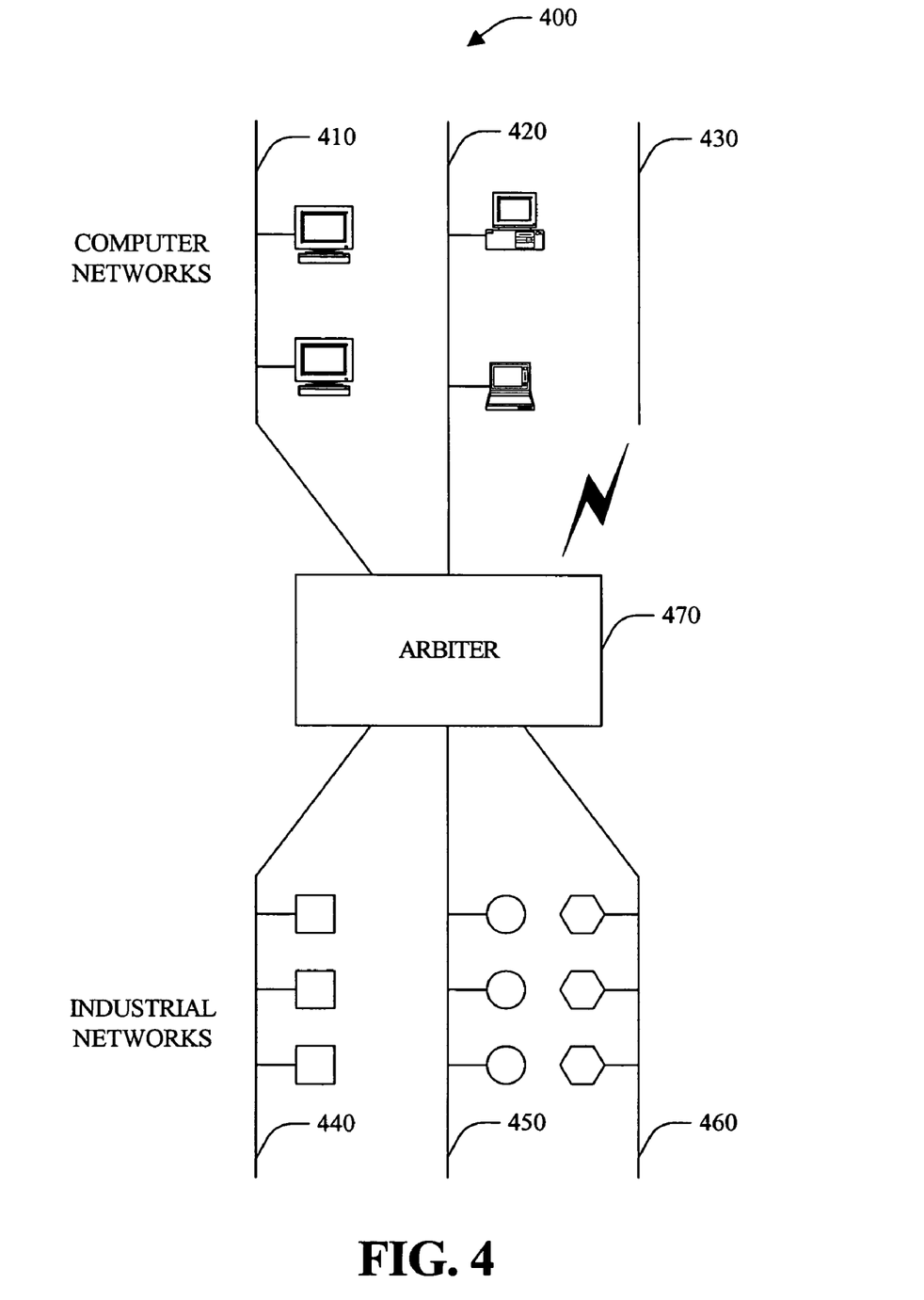
FIG. 4 illustrates an exemplary distributed system, in accordance with an aspect of the present invention.

FIG. 4 illustrates a distributed system 400 for accessing industrial device data, in accordance with an aspect of the present invention. The system 400 comprises computer networks 410, 420 and 430 with a plurality of computing devices residing thereon, industrial networks 440, 450 and 460 with a plurality of industrial devices residing thereon, and an arbiter 470 that facilitates access amongst the devices associated with both the computer networks 420 and the industrial networks 430.

As described previously, the industrial devices associated with the industrial networks 440, 450 and 460 can include data converting capabilities, which map data stored within data structures to relational database tables. It is to be appreciated that industrial networks such as DeviceNet, ControlNet, Ethernet/IP and the like can be employed in accordance with an aspect of the present invention. The computing networks 410, 420 and 430 can be wire and/or wireless networks and can include workstations, desktop computers, laptops, etc. that can employ various operating systems such UNIX, HPUX, IBM, AIX, Linux, Microsoft and the like. These devices can employ standard database connections to interact with the relational database tables.

Figure 5:
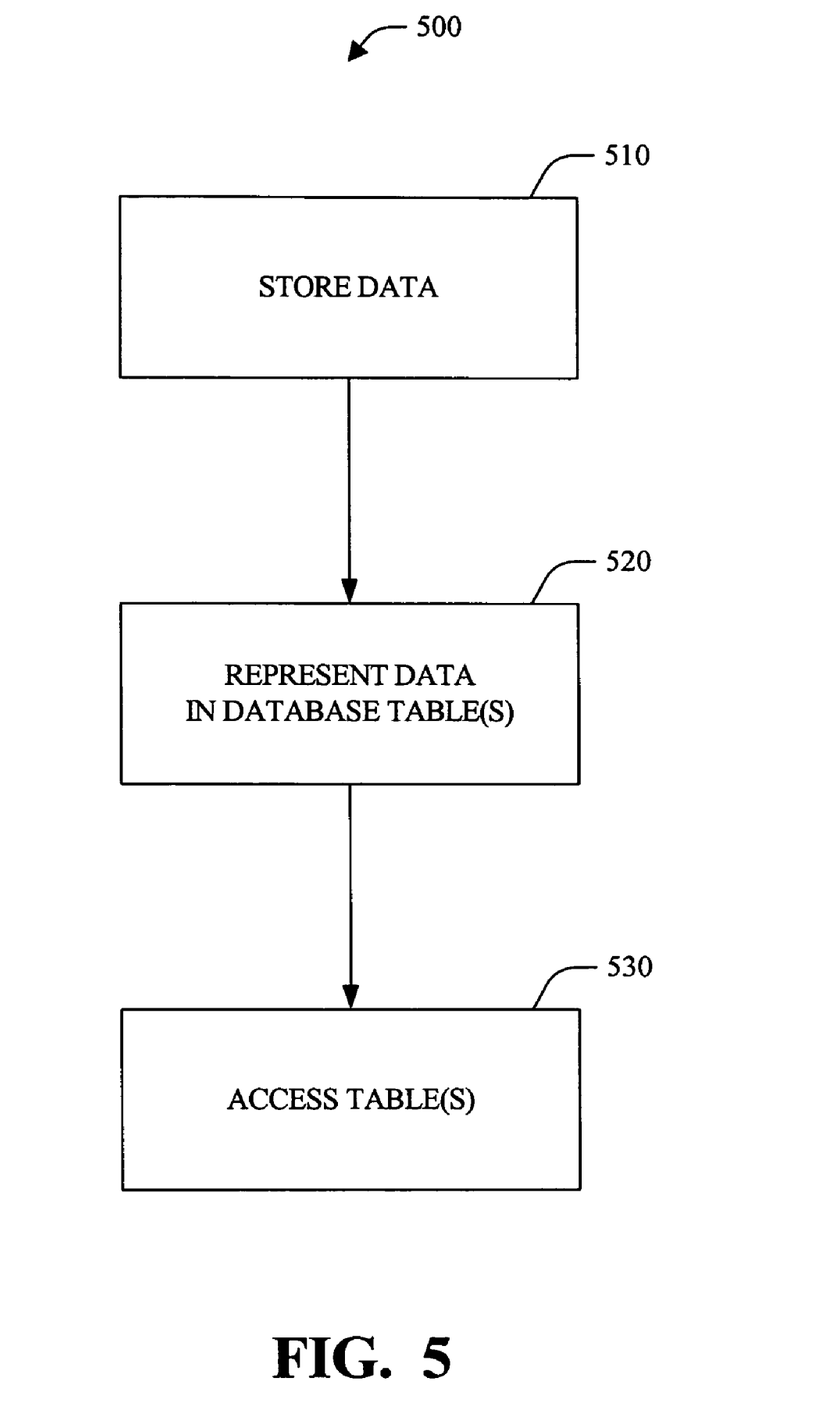
FIG. 5 illustrates an exemplary methodology that stores industrial device data in relational database tables, in accordance with an aspect of the present invention.
Figure 6:
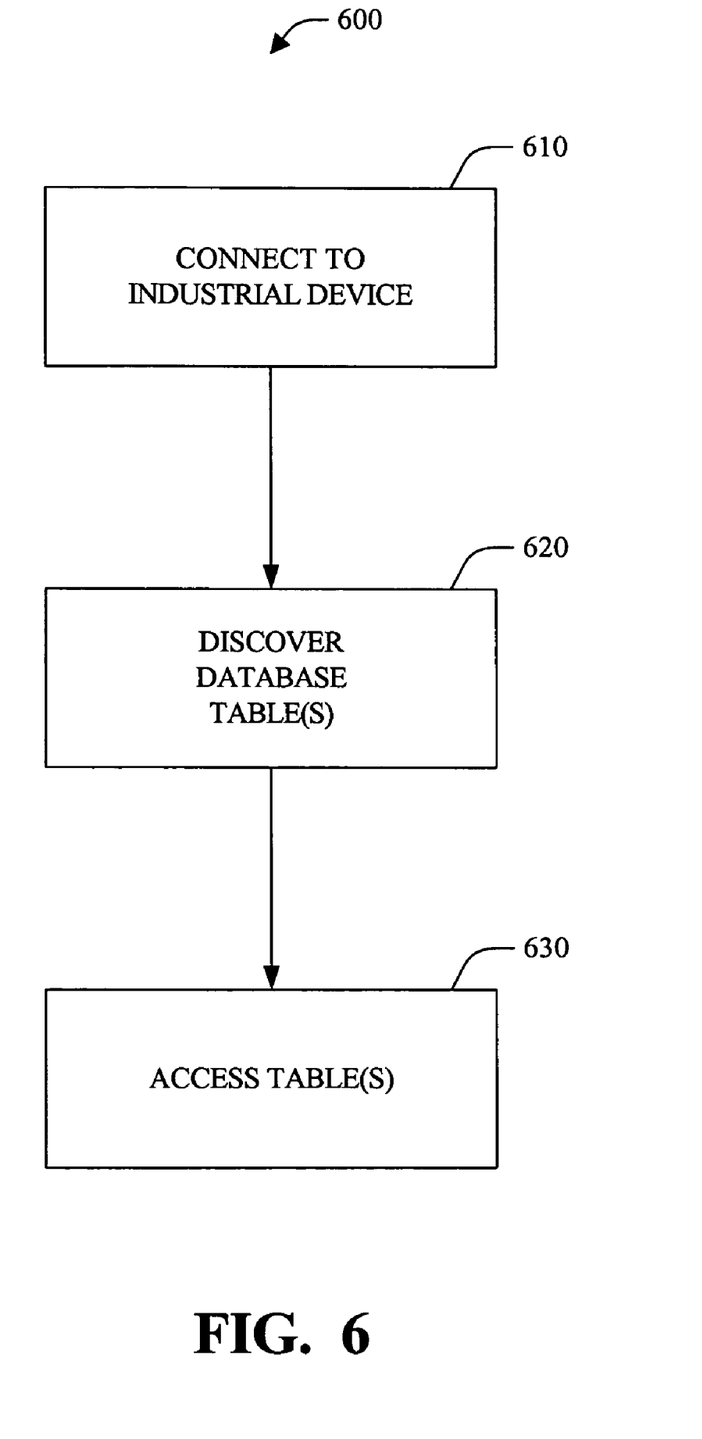
FIG. 6 illustrates an exemplary methodology to access data stored within an industrial device, in accordance with an aspect of the present invention.

FIGS. 5 and 6 illustrate methodologies, in accordance with an aspect the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

Proceeding to FIG. 5, a methodology 500 that generates relational database tables to facilitate access to industrial device data is illustrated in accordance with an aspect of the present invention. At reference numeral 510, data is stored within an industrial device. This data can include information related to performance, control, state, errors, etc. Typically, this data is stored within user defined data structures. At 520, a mechanism can be employed to represent this data as database tables. Typically, the elements of respective data structures are mapped to the columns of a row, or record of the relational table, as described in detail above. At reference numeral 530, a remote machine employs a standard database connection (e.g., JDBC and the like) to access the data within the relational tables. Such access includes reading and writing data and can occur concurrently across a plurality of relational tables.

FIG. 6 illustrates a methodology 600 that facilitates access to industrial device data stored within relational database tables, in accordance with an aspect of the present invention. At reference numeral 610, a remote device establishes a data connection with an industrial device via a standard database interface. Since the industrial device data is stored within relational database tables, custom software does not need to be executing on either the industrial device or the remote system in order to access the data.

At reference numeral 620, the remote device can issue a request to discover available relational tables within the industrial device and/or request access to a specific relational table. For example, the request can include information such as device address, memory address, password, security level, etc. At reference numeral 630, the remote device can access the industrial device data. Such access can include reading and writing data, as well as committing transactions.

Figure 7:
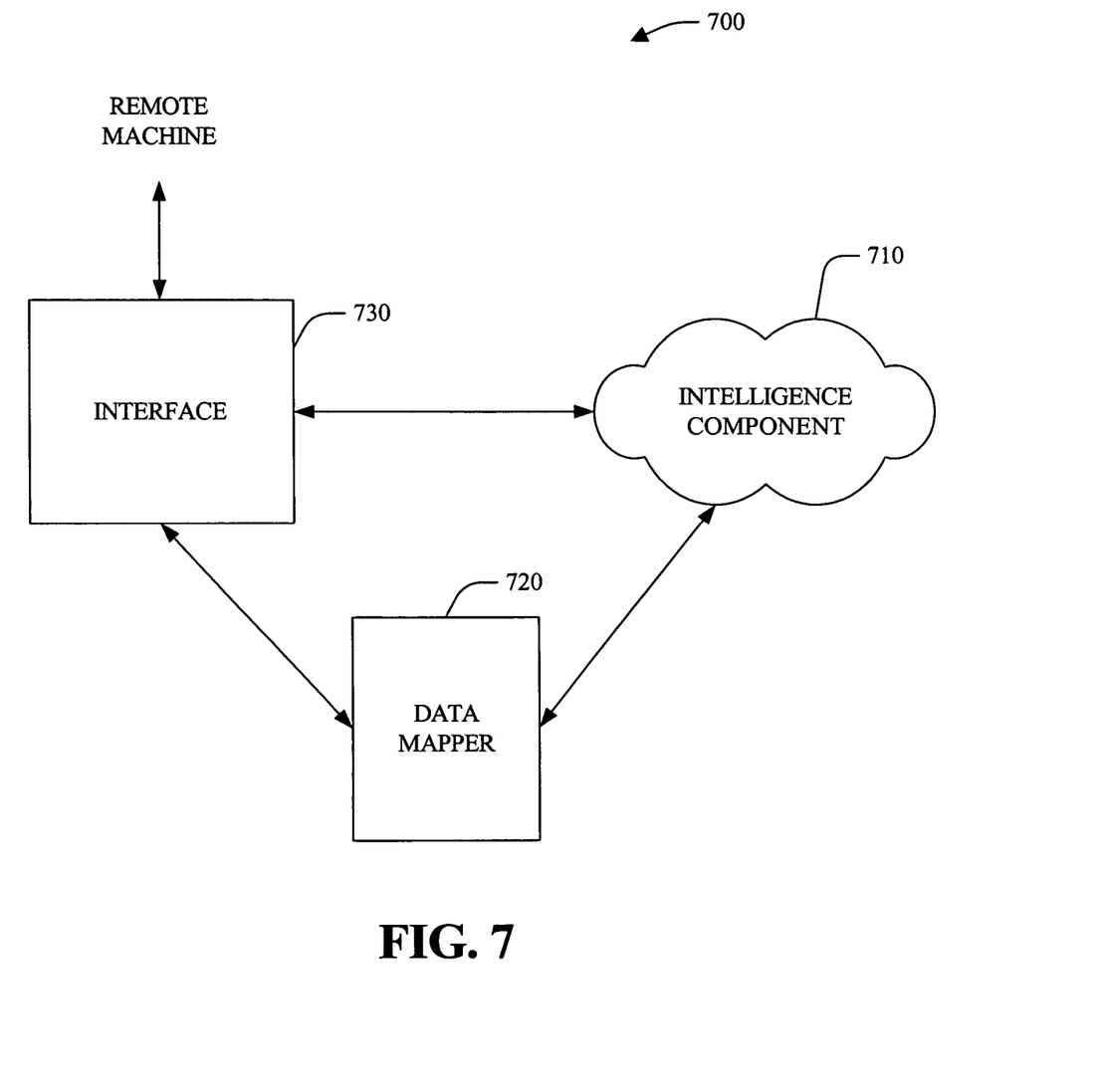
FIG. 7 illustrates an exemplary system that employs intelligence to facilitate access to data stored within an industrial device, in accordance with an aspect of the present invention.

FIG. 7 illustrates a system 700 that employs intelligence to facilitate access to industrial device data, in accordance with an aspect of the present invention. The system 700 comprises an intelligence component 710, a data mapper 720 and an interface 730. The intelligence component can employ statistics, probabilities, inferences and classifiers (e.g., explicitly and implicitly trained), including Bayesian learning, Bayesian classifiers and other statistical classifiers, such as decision tree learning methods, support vector machines, linear and non-linear regression and/or neural networks to facilitate decision-making.

The data mapper 720 can be utilized to construct relational database tables from data structures stored within the industrial device. In one aspect of the present invention, the data mapper 720 can be launched via a request and/or automatically activated, for example, based on time lapse, activity, a polling technique, etc. In yet another aspect of the present invention, the intelligence component 710 can be utilized to facilitate data mapper 720 activation. The data mapper 720 can be employed with the intelligence component 710 to map respective elements of a data structure(s) to a record(s) of a corresponding database table(s), as previously described.

The intelligence component 710 can be employed in connection with the interface 730 to couple a remote system with the industrial device and to facilitate data exchange between the remote system and industrial device. For example, the intelligence component 710 can retrieve suitable protocols and configuration and initiate communication. The protocols and configuration can be related to standard database interfaces. For example, JDBC and/or open source interfaces can be utilized to read data from the database tables and/or write data to the database tables. The foregoing mitigates the need to develop custom software and execute the software on the industrial device and/or the remote system. In addition, the intelligence component 710 can invoke discovery of database tables stored with the industrial device.

The intelligence component 710 can then be employed to facilitate data transfer. Typically, data is transferred via compact binary packets rather than long ASCII formats such as XML. This can reduce the number of bytes required to send particular data and decrease processing load and time. In addition, database tables can be concurrently accessed to process transactions. Thus, transactions can be concurrently committed, rolled back and/or aborted. Moreover, any operating system that can utilize a standard database connection can be utilized.

Figure 8:
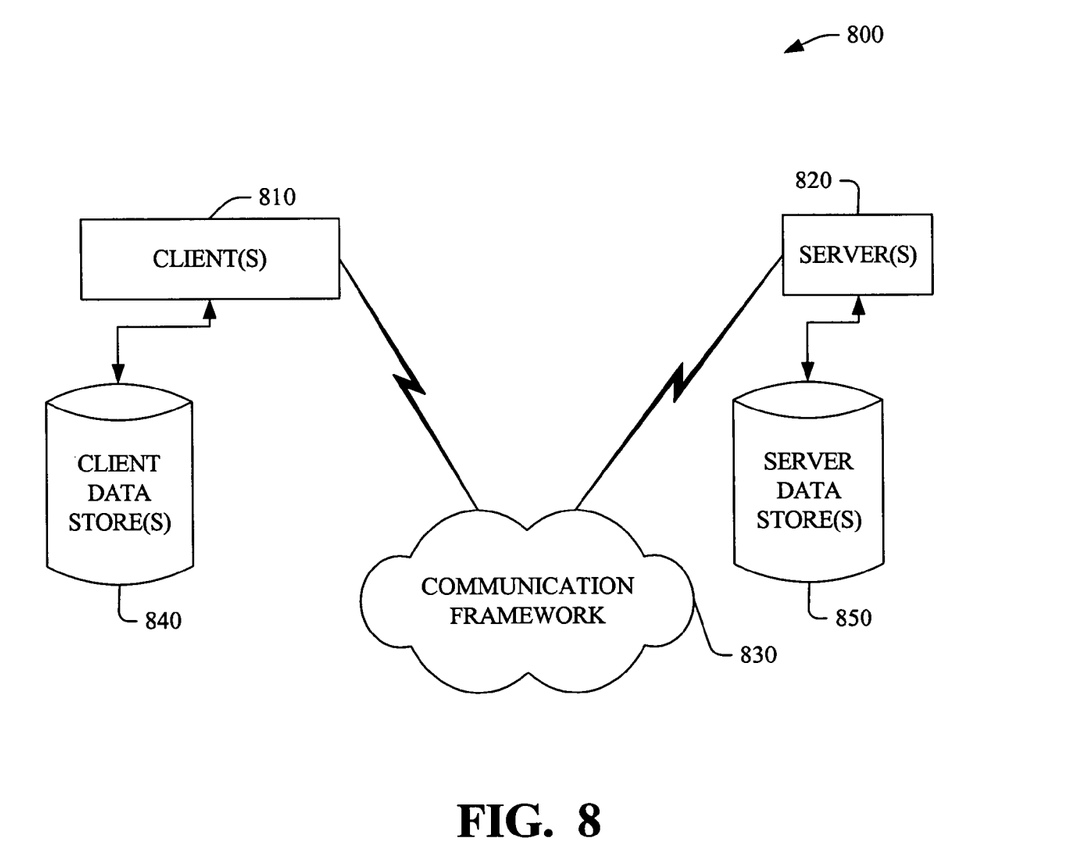
FIG. 8 illustrates an exemplary networking environment wherein the novel aspects of the invention can be employed.
Figure 9:
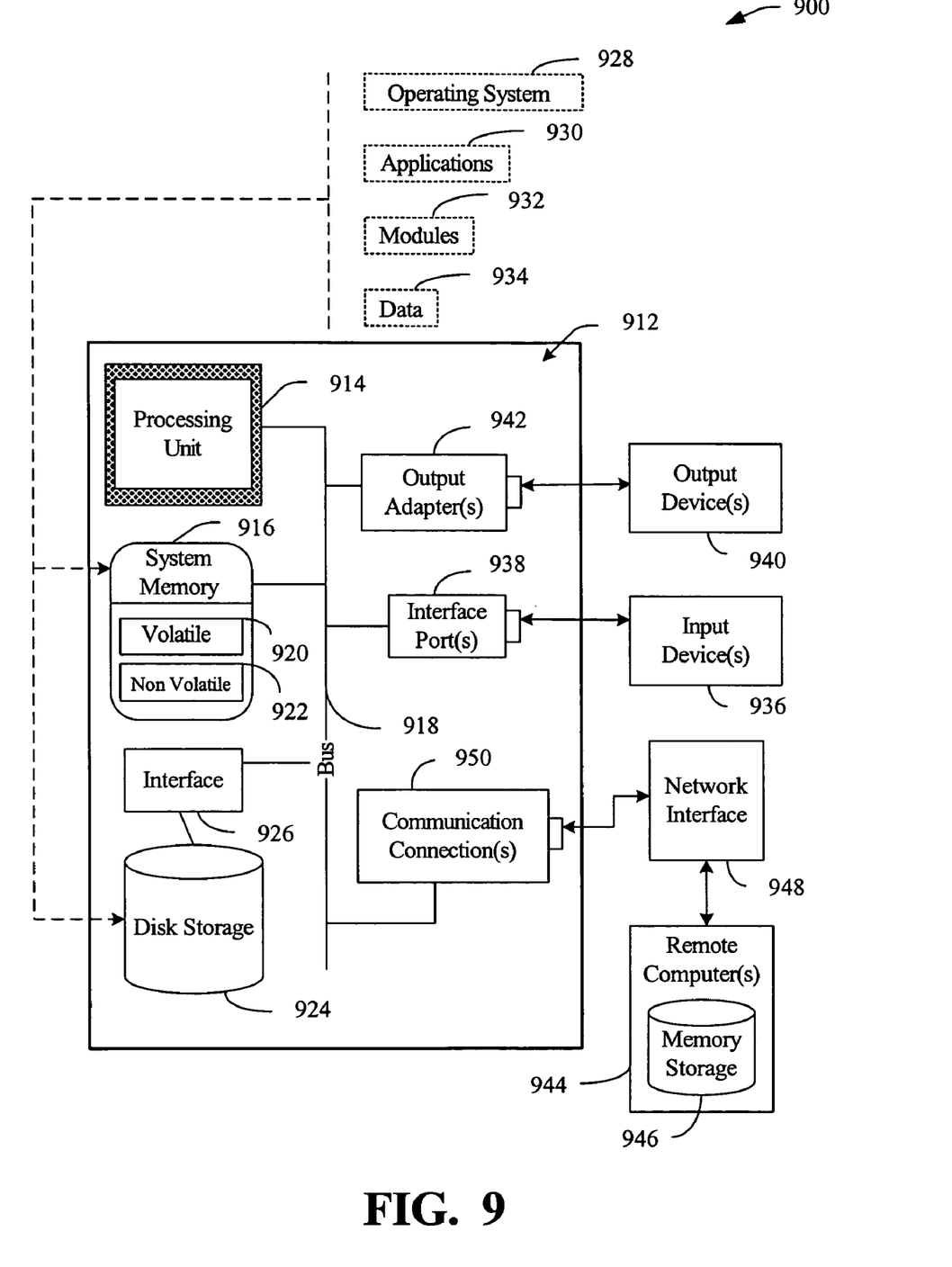
FIG. 9 illustrates an exemplary computing environment wherein the novel aspects of the invention can be employed.

In order to provide a context for the various aspects of the invention, FIGS. 8 and 9 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

FIG. 8 is a schematic block diagram of a sample-computing environment 800 with which the present invention can interact. The system 800 includes one or more client(s) 810. The client(s) 810 can be hardware and/or software (e.g., threads, processes, computing devices). The system 800 also includes one or more server(s) 820. The server(s) 820 can also be hardware and/or software (e.g., threads, processes, computing devices). The servers 820 can house threads to perform transformations by employing the present invention, for example. One possible communication between a client 810 and a server 820 can be in the form of a data packet transmitted between two or more computer processes. The system 800 includes a communication framework 830 that can be employed to facilitate communications between the client(s) 810 and the server(s) 820. The client(s) 810 can be connected to one or more client data store(s) 830 that can be employed to store information local to the client(s) 810. Similarly, the server(s) 820 can be connected to one or more server data store(s) 830 that can be employed to store information local to the servers 820.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that facilitates access to industrial data, comprising:
   at least one processor that executes computer readable components in an industrial automation environment, the components including:
      a mapping component, residing within the industrial automation environment, that generates a database table from one or more user defined data structures associated with an industrial control device, the mapping component discovers the one or more user defined data structures and maps elements of the one or more user defined data structures to respective columns of at least one of a row or record of the database table, industrial control device data stored in the database table is accessible through a standard database interface without requirement of proprietary data access software tailored for the industrial device, and
      an arbiter component that facilitates access between the industrial control device and computer networks via an access to the database table.

2. The computer implemented system of claim 1, a standard database connection associated with the standard database interface is a Java DataBase Connectivity (JDBC) connection.

3. The computer implemented system of claim 1, the database table is a relational database table.

4. The computer implemented system of claim 1, the database table is accessed via one or more remote systems that employ disparate operating systems.

5. The computer implemented system of claim 1, the mapping component is activated at least one of when a request to access the industrial control device's data is received, periodically, based on a time lapse, or based on a polling technique.

6. The computer implemented system of claim 1, wherein the mapping component maps a single user defined data structure to more than one database table.

7. The computer implemented system of claim 1, wherein data stored in the database table is transferred between the industrial control device and a remote system as a compact binary file.

8. The computer implemented system of claim 1, wherein the mapping component maps each of the one or more user defined data structures to a respective row of the database table.

9. A computer implemented industrial control device comprising:
   at least one processor that executes the following computer executable components stored on at least one computer readable medium:
      an interface component that facilitates at least one of reading from or writing to one or more relational database tables stored within the industrial control device, without requirement of platform specific software tailored for the industrial control device; and
      a mapping component that discovers one or more user defined data structures utilized by the industrial control device and maps at least one element of the one or more user defined data structures to at least one respective column of a row or record in the one or more relational database tables, the mapping component populates the one or more relational database tables with data from the one or more user defined data structures.

10. The computer implemented industrial control device of claim 9, the mapping component is executed within at least one of a module of the industrial control device, a host computer, or the interface component, without user intervention.

11. The computer implemented industrial control device of claim 9, the mapping component is executed without knowledge of industrial control device data layout.

12. The computer implemented industrial control device of claim 9, the one or more relational database tables are concurrently accessed for at least one of transaction commitment, transaction rollback or transaction termination.

13. The computer implemented industrial control device of claim 9, the standard database connection is employed to establish a connection with the interface component by a remote device.

14. The computer implemented industrial control device of claim 13, the standard database connection is an SQL-compliant connection.

15. The computer implemented industrial control device of claim 13, the standard database connection is a Java DataBase Connectivity (JDBC) connection.

16. The computer implemented industrial control device of claim 15 wherein the JDBC connection utilizes a JDBC Open or Select command to read data from the one or more relational database tables and a JDBC Post command to write data to the one or more relational database tables.

17. The computer implemented industrial control device of claim 9 further comprises an intelligence component that facilitates mapping, reading and writing the industrial control device data by employing one or more machine learning techniques, the intelligence component determines at least one of when, how or which data structures associated with the industrial control device are transformed to the one or more relational database tables, by employing at least one classifier.

18. A computer implemented method of accessing industrial device data, comprising:
   employing at least one processor that executes computer executable instructions in an industrial environment to perform the following acts:
   discovering one or more user defined data structures utilized by an industrial control device;
   mapping each element of the one or more user defined data structures to a respective column of at least one of a row or record of a database table;
   populating the database table with data from the industrial control device stored in the one or more user defined data structures via a processing module; and
   enabling access to the data within the database table, without platform specific data access software associated with the industrial control device.

19. The computer implemented method of claim 18, further comprising facilitating a connection with the industrial control device by employing a SQL-compliant database connection.

20. The computer implemented method of claim 18, wherein the enabling access includes enabling at least one of committing a transaction, rolling back a transaction or aborting a transaction.

21. The computer implemented method of claim 18 further comprises transferring data from the database table to a remote entity in one or more compact binary packets.

22. The computer implemented method of claim 18 further comprises enabling concurrent access to two or more database tables.

23. An industrial control processing system comprising:
   at least one computer readable storage medium storing computer executable instructions that when executed by the at least one processor implement components comprising:
   means for opening a database connection with the industrial control device;
   means for discovering at least one user defined data structure utilized by an industrial control device and mapping each element of the at least one user defined data structure to a respective column of at least one of a row or record of at least one database table, the at least one database table mapped with data from the at least one data structure;
   means for transferring data between the industrial control device and a remote entity as compact binary information via the at least one database table.

* * * * *